Jan. 17, 1961 E. L. CANFIELD 2,968,691
ELECTRICAL CONDUCTORS AND CONNECTORS THEREFOR
Filed April 9, 1957 5 Sheets-Sheet 1
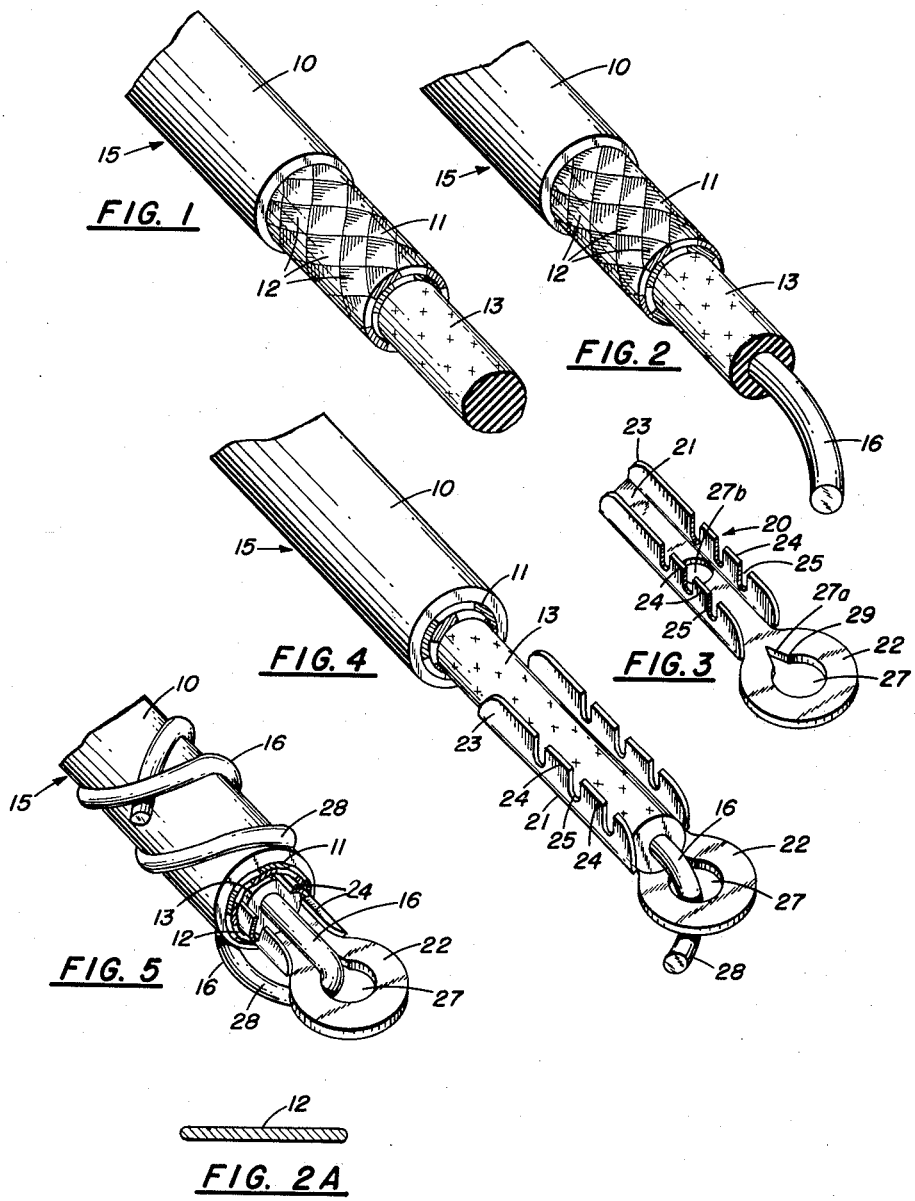
INVENTOR
EARL L. CANFIELD
BY
ATTORNEYS

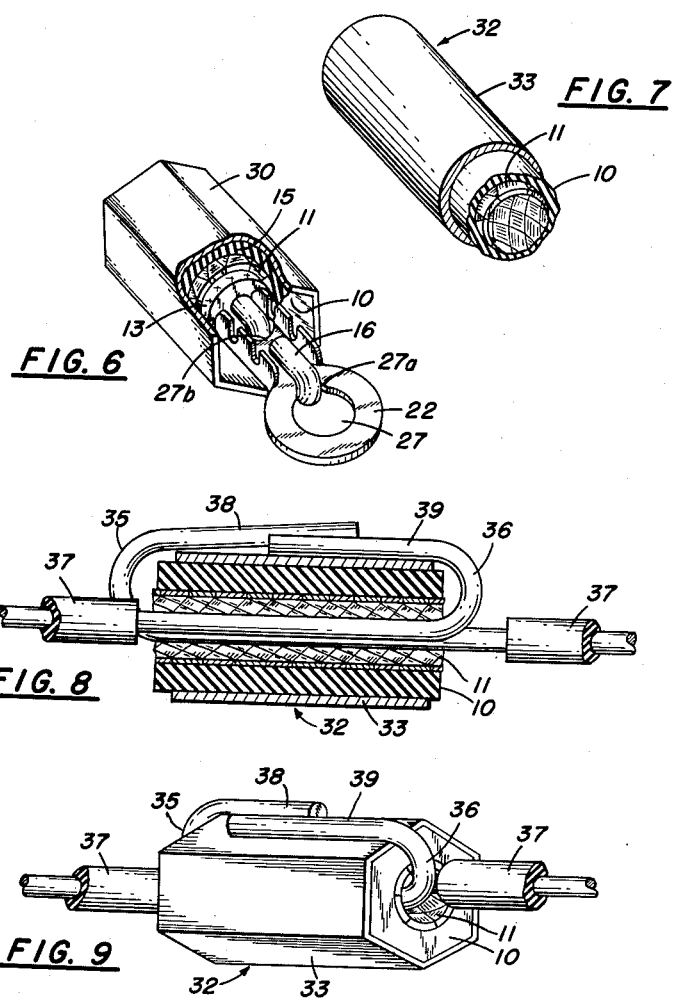

Jan. 17, 1961 E. L. CANFIELD 2,968,691
ELECTRICAL CONDUCTORS AND CONNECTORS THEREFOR
Filed April 9, 1957 5 Sheets-Sheet 3

INVENTOR
EARL L. CANFIELD

BY
ATTORNEYS

Jan. 17, 1961 E. L. CANFIELD 2,968,691
ELECTRICAL CONDUCTORS AND CONNECTORS THEREFOR
Filed April 9, 1957 5 Sheets-Sheet 4
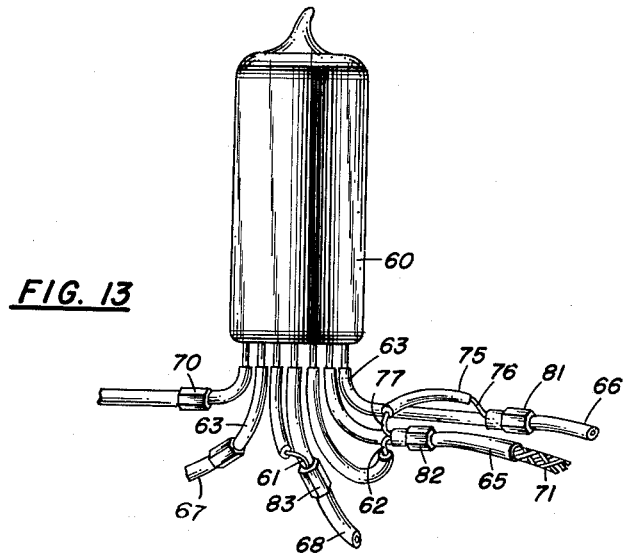
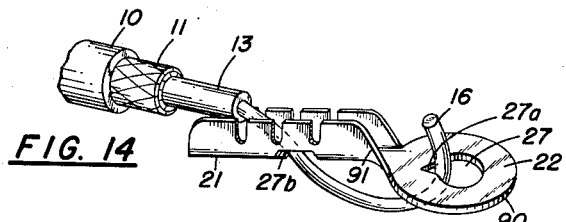
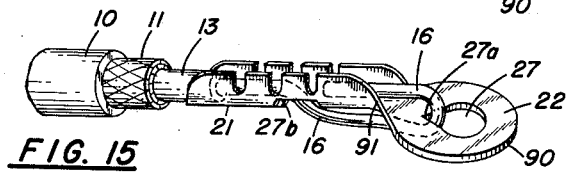
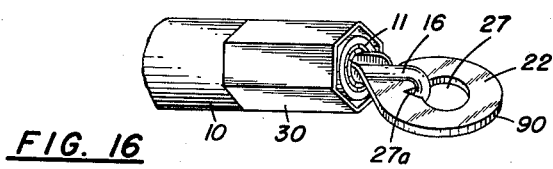
INVENTOR
EARL L. CANFIELD Jan. 17, 1961 E. L. CANFIELD 2,968,691
ELECTRICAL CONDUCTORS AND CONNECTORS THEREFOR
Filed April 9, 1957 5 Sheets-Sheet 5
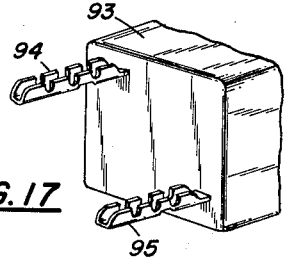
FIG. 17
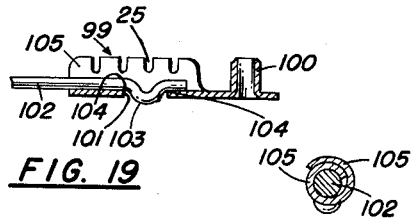
FIG. 19
FIG. 20
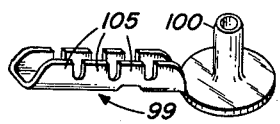
FIG. 18
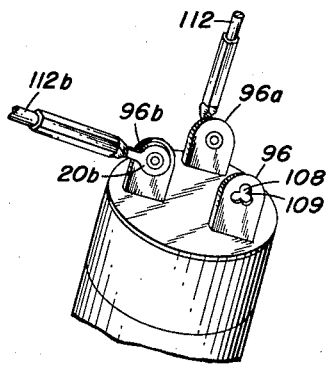
FIG. 21
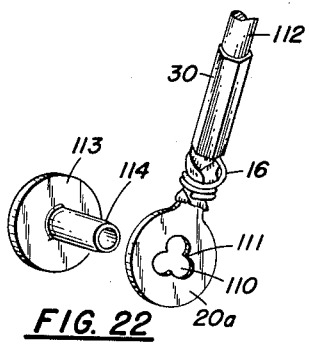
FIG. 22
FIG. 23
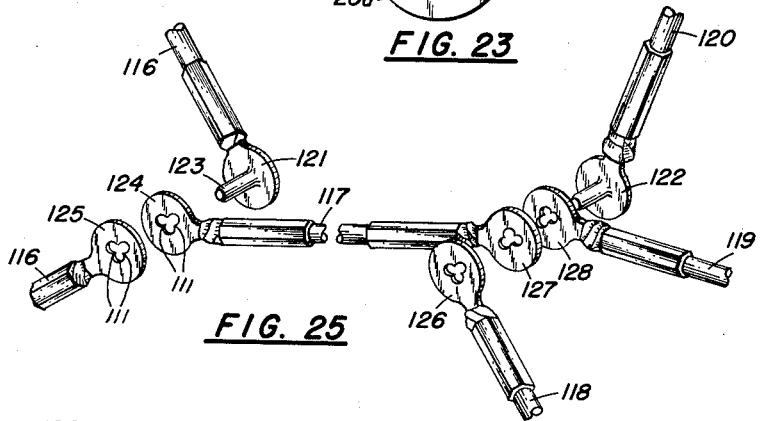
FIG. 25
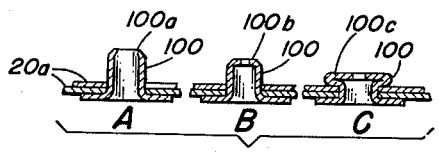
FIG. 24
INVENTOR
EARL L. CANFIELD
BY
ATTORNEYS

United States Patent Office 2,968,691
Patented Jan. 17, 1961

2,968,691

ELECTRICAL CONDUCTORS AND CONNECTORS THEREFOR

Earl L. Canfield, Book Hill Road, Essex, Conn.

Filed Apr. 9, 1957, Ser. No. 651,694

3 Claims. (Cl. 174—75)

This invention relates to electrical conductors and particularly to tubular electrical conductors and connectors therefor.

In the manufacture of electronic equipment, electrical connections are made usually by soldering a terminal lug to a solid or a stranded wire. In making such connections, the following faults occur: damage to the circuit component and the insulation due to overheating, embrittlement of the copper wire, cold joints, trapped flux and oxides, corrosion, and connection errors. Solderless conductors have come into use as an attempt to remedy these faults, but a common source of failure or imperfection of such connectors has been the difficulty of achieving a permanently sturdy electrical contact between the wires and the terminal. In general, the required mechanical connection can only be produced for a limited external contact area between the wire and the terminal, the "spring-back" resiliency of the wire or the connecting terminal or clip and the consequent relaxation of pressure therebetween being responsible for the resulting imperfect contact.

In making either solder or solderless connections, insulation has to be stripped off the end of the wire and in the case of multiple stranded wires, it is rather usual that numbers of the strand will be broken and drop off, causing a reduction in the current carrying capacity of the wire. Solid wires break off after relatively few flexures, particularly, if they are nicked in the process of stripping off the insulation.

Accordingly, it is an object of this invention to avoid the above mentioned difficulties by providing a tubular electrical conductor with which an improved solderless connection may be made.

It is a further object of the invention to provide a tubular electrical conductor that is very pliant, so that it will have a high resistance to breaking by flexure.

It is a further object of the invention to provide a tubular electrical conductor for making a low resistance connection with a terminal lug received therein.

It is a further object of this invention to provide a tubular conductor in which the exterior insulating wall will be sealed coextensively upon an interior conductive wall when connection has been made, thus eliminating the need of stripping insulation and of using short, generally ill-fitting sleeves of insulation to protect the end of the wire or the connection.

Another object of the invention is simply and effectively to splice two or more wires by inserting them side by side in a short length of insulation coated braided tubular conductor provided with an outer sleeve which is squeezed to bring the braided conductor into tight contact with the wires.

According to one aspect of the invention, there is provided an electrical conductor consisting of a conductive braided tube formed of a plurality of strips of tinsel or thin metal or foil braided on a core of resilient insulating material, such as, silicone rubber, the braided tube being covered by an exterior coating or jacket of insulating material, which may also be silicone rubber. Silicone rubber is preferred because of its ability to withstand very high and very low temperature of at least −60° C. to +150° C. and because it does not become set under pressure at high temperatures or lose its flexibility at low temperatures. The insulating core and the braided tube are preferably formed so that the end of the braided tube and the insulating jacket thereof can be pushed back together along the core. The braided tube when thus pushed back tends to expand and leave a space between itself and the core, into which space a terminal lug may be readily inserted.

The silicone rubber core may have a very thin solid or stranded wire extending therethrough axially. The wire may be connected to a terminal lug and serve as an additional current conductor in parallel with the braided tubular conductor. The entire conductor is, in most instances, very small. If the braided tube, for example, is intended to have a capacity of 400 circular mils the diameter of the core will be about 35 thousandths of an inch. The use of very thin metallic tinsel or foil to form the braided tube results in a saving of metal, particularly in high frequency conductors, and permits the conductor to have great flexibility. Another advantage of tinsel or metallic foil is that the strands of the braided conductor cannot pierce the insulation. The metallic foil may have a thickness of a few thousandths of an inch more or less.

Another feature of the invention is the solderless connection of a terminal lug to the above-described conductor by the insertion of the lug between the core and the braided tube. The inserted lug may be fastened by threading the end of the axial wire therethrough, which wire may be then wrapped around the conductor to serve the end thereof and exert pressure through the resilient outer coating of the conductor to bring the braided tube into tight contact with the lug. Alternatively a metallic sleeve or ferrule may be placed on the end of the conductor and then squeezed, say from a circular to a hexagonal shape, to exert a pressure between the braided tube and the lug. This pressure is permanent because the lug and braided conductor are pressed together by the compressed highly resilient inner core and outer insulating coating.

According to another aspect of the invention, two or more wires are spliced together by passing the wires through a short length of braided tubular conductor from opposite sides thereof, the braided conductor being provided with an insulated coating of the type described above and with a metallic sleeve closely fitting the exterior coating. The sleeve is then squeezed to bring the braided conductor into close contact with the wires extending therethrough. The ends of the wires may then be bent back upon themselves along the outside of the metallic sleeve to resist pull on the splice. An insulating sleeve may then be placed over the splice. The short braided tube may be used for splicing two or more solid or stranded wires, for splicing a solid wire to a stranded wire, or for connecting a wire to a terminal. This construction is well adapted for splicing the conductors in telephone cables as well as for other uses.

According to a further feature of the invention the metallic splicing sleeve may be provided with a longitudinal groove or channel in which the ends of the wires are lodged. In this case, the squeezing of the sleeve to bring the braided conductor into contact with the wires also squeezes together the ends of the wires lying in the channel, thereby providing a splice which is capable of resisting a very great pulling strain.

A general object of the invention is to provide improved connections for conductors and terminals.

Another object of the invention is to provide terminals for conductors and electrical devices.

Still another object and feature of the invention is to make a stable connection of uniformly low resistance simply and quickly between a plurality of terminals. The terminals may be connected to solid, stranded, or tubular conductors, and some of them may constitute the terminals of an electrical device. The terminals are interconnected by riveting, which is effected by providing one of the terminals or a separate rivet with a hollow pin which extends through openings in the terminals, the pin being formed so that it is transformed into rivet merely by being squeezed. In order to provide a low resistance fixed connection the openings in the terminals through which the rivet extends are preferably provided with sharp points which bite into the rivet and thereby produced a low resistance connection.

Further objects and advantages of the invention will be apparent from the following description thereof and the drawings wherein:

Fig. 1 is a perspective view of a braided tubular conductor with portions of the outer jacket and the braided conductor cut away for illustrative purposes;

Fig. 2 is a perspective view of another braided tubular conductor with portions thereof cut away;

Fig. 2A is a cross section of one strand of a braided conductor on a greatly enlarged scale;

Fig. 3 is a perspective view of a terminal lug;

Fig. 4 is a perspective view showing a step in the assembly of a tubular conductor with a terminal lug;

Fig. 5 is a perspective view showing a tubular conductor assembled with a terminal lug;

Fig. 6 is a view similar to that of Fig. 5 showing an electrical connection provided with a hexagonal ferrule;

Fig. 7 is a perspective view of a splicing ferrule;

Fig. 8 is a cross sectional view of a splice;

Fig. 9 is a perspective view of a wire splice showing the ferrule squeezed into a hexagonal form;

Fig. 13 illustrates the connection of tubular conductors to electron tube leads;

Figs. 14–16 show three steps in the connection of a terminal lug to a tubular conductor;

Fig. 17 is a perspective view of an electrical device adapted to be connected to a tubular conductor;

Fig. 18 is a perspective view of another type of terminal lug;

Figs. 19 and 20 are sectional views showing a solid wire connection to the lug of Fig. 18;

Fig. 21 is a perspective view of an electrical device having a plurality of terminal connections;

Fig. 22 is a perspective view showing another terminal lug and connecting means therefore.

Fig. 23 is a detailed sectional view of a connection of the type illustrated in Fig. 22;

Fig. 24 illustrates stages in the formation of a riveted connection; and

Fig. 25 is an exploded perspective view illustrating the forming of cabling according to the invention.

Figure 10:
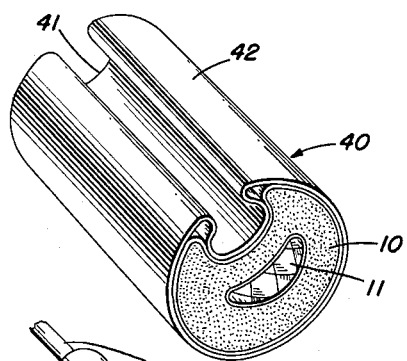
Fig. 10 is a perspective view of a grooved splicing ferrule.
Figure 11:
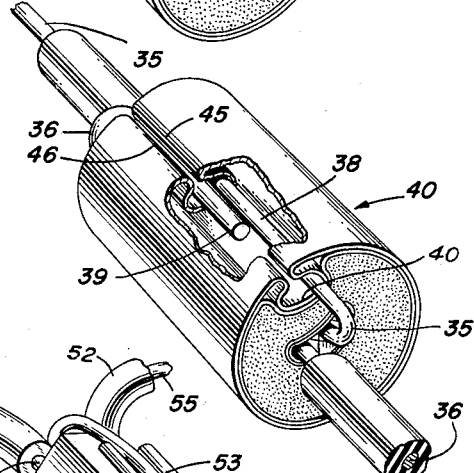
Fig. 11 is a perspective view of a splice formed with a grooved ferrule.

Referring to Fig. 1, there is shown a tubular conductor generally indicated by the numeral 15 and consisting of an outer insulating jacket 10, which may be formed of silicon rubber extruded over a braided tubular metallic conductor 11. The braided conductor is formed of a plurality of flat, very thin, flexible, closely woven strands of conductive material preferably braided over and under in opposite running helices. The flat strands 12 may suitably be of metallic tinsel or foil strips preferably having rounded edges. Such form may be obtained by rolling thin round wire to flat shape. The strands 12 may be formed of copper, having a silver coating thereon. Alternatively, the strands 12 may also be formed of aluminum or other suitable conductors. By virtue of the thinness of strands 12, conductor 11 is very pliant and may bend readily without strain. In bending the tubular conductor 11, the strands 12 will twist if necessary, so as to wrap around a bend. Because the strands are individually very pliant, the conductor 11 composed of these strands is also very pliant and capable of being bent repeatedly without rupturing. Each flat strand 12 of tubular conductor 11 may have a cross sectional shape such as shown in Fig. 2A, being a flat thin strip with rounded edges. To give one example, the strands 12 may have a thickness of say, 0.0015 inch and a width of 0.02 inch.

The closely woven tubular conductor thus will be pliant, compressible and highly resistant to breakage by flexure. Moreover, it will increase in diameter when contracted longitudinally, permitting a lug to be readily inserted therein, and contract and tightly grip the lug when it is stretched out again. As few as four strands may be used and a braided conductor may be provided which is equivalent in ohmic resistance to No. 30 standard wire gauge. Whereas such a small gage of solid wire is embrittled by soldering, its ohmic equivalent in the braided tubular conductor has been found well suited to the making of fast mechanical connections with good electrical contact. For most purposes conductors of eight or more strands are preferred.

To provide a relatively continuous interior conductive surface and to prevent intrusion of the insulating coating 10 into the interior of the tubular conductor 11 at the time of its application, the longitudinal edges of adjacent running strands 12 extend spirally in substantially abutting relationship. For this reason, the braided tube 11 is substantially imperforate.

In order to provide a support for braided conductor 11 to facilitate the braiding thereof, a core 13 is provided which substantially fills the space within the braided conductor. Core 13 may be formed of any suitable material, either insulating or conductive, and according to one preferred embodiment of the invention, core 13 is formed of extended silicone rubber. The conductor shown in Fig. 1 is manufactured by first providing the core 13 then braiding the tubular conductor 11 thereon and thereafter coating the braided conductor with the silicone rubber jacket 10 preferably applied by extrusion.

Fig. 2 illustrates a conductor which may consist of a silicone rubber jacket 10, a braided conductor 11 and a core 13, similar to that described in connection with Fig. 1. A wire 16 extends axially through core 13. The wire 16 may be a solid or stranded conductor such as a fine copper wire which is itself very flexible and permits the entire conductor consisting of wire 16, core 13, braided conductor 11 and the outer jacket 10 to have very great flexibility.

Fig. 3 shows a terminal lug adapted to be used for making connection to the conductors heretofore described. The lug 20 has a channel 21 and terminal portion 22. The end 23 of the channel is preferably tapered to facilitate insertion into the braided conductor in a manner to be described later. The channel 21 is further provided with sharp edges or teeth 24 formed either by serrations or slots 25. The channel may be essentially three-sided, having a rounded bottom and sides spaced from each other so that core 13 fits therein. The lug is stamped from thin sheet metal or may be forged or otherwise formed. The terminal portion 22 of the lug is provided with an opening 27 which may have a V-shaped slot 27a adapted to receive wire 16. The opening 27 is large enough to receive other wires or a pin or a screw terminal. The lug may also be provided with a hole 27b. Lug 20 may be formed of copper and preferably coated with a non-corrosive metal, such as silver, although other metals such as tin or cadmium may be used.

In order to form an electrical connection the lug 20 may be assembled to conductor 15 in various ways, for example, in the following manner: A portion of the jacket 10, braided conductor 11, and the core 13 may be cut away, leaving a length of wire 16 bare. Holding the wire 16, the jacket 10 and braided conductor may be pushed back along core 13. In doing this, the braided conductor 11 expands slightly in the radial direction, being free to expand because of the resiliency of the silicone rubber jacket 10. The channel 21 is then pushed in between the braided conductor 11 and core 13. Either the entire portion 21 may be thus inserted or it may be partially inserted and the jacket 10 and braid 11 may be pulled thereover into the position shown in Fig. 5. The wire 16 may then be anchored to the lug in a suitable manner, preferably by passing the wire through the opening 27 and then wrapping it around the end of the coating 10 of conductor 15, as shown at 28, in order to serve the end of the conductor 15. Only a few turns of wrapping 28 are shown, but in practice a larger number of closely spaced turns may be used. By producing a tight wrap 28 of the wire around the conductor 15, the outer jacket 10 and the braided conductor 11 may be compressed into tight engagement with the channel 21 in order to provide a tight contact between braided conductor 11 and lug 20. If desired, a sleeve or ferrule 30 may be slipped over the end of the coating 10 of conductor 15. The sleeve may initially be cylindrical and then pressed into the hexagonal shape shown in Fig. 6, by means of a suitable tool, such as a wrench or a pair of pliers or a press. When the ferrule 30 is used, the wrapping 28 may be dispensed with. In any event, the wrapping 28 or the ferrule 30 squeezes the braided conductor 11 against the channel 21 and brings it into firm contact with lug 20. The pressure between the lug 20 and the braided conductor is maintained permanently by virtue of the resilience of the silicone rubber core 13 and jacket 10.

When sleeve 30 is used with the conductor 15 shown in Fig. 2 the wire 16 may be passed through hole 27b, then under the lug and up through slot 27a into the channel of the lug. The lug is then inserted between the braided tube 11 and the core 13, with the core lying in a portion of the channel. Thereafter the sleeve 30 is positioned on the end of the conductor 15 and squeezed into the shape shown in Fig. 6.

The lug may be fastened to the conductor 15 shown in Fig. 1, which does not include the wire 16, by inserting the channel 21 of the lug into the braided tube 11, so that core 13 lies in the lug channel. The sleeve 30 may then be applied as described above to fasten the lug to the conductor.

Fig. 7 shows a splicing ferrule 32 consisting of a short length of tubular conductor of the type previously described consisting of braided tubular conductor 11, a silicone rubber jacket 10 surrounding the braided conductor and a metallic sleeve 33 closely fitting jacket 10. Using the splicing ferrule 32, a pair of wires 35 and 36 may be spliced together in the manner indicated in Fig. 8. The wires may have one or more coatings 37 of insulation or sheaths, which are stripped off for a suitable distance. The ends of wires 35 and 36 are passed through the splicing ferrule 32, from opposite ends thereof and the ends of the wires are bent backwards upon themselves as indicated at 38, 39 so that they lie along the outside of metallic sleeve 33. Before the ends 38 and 39 of the wires are bent back into the position shown, the sleeve 33 is tightly squeezed to bring the braid 11 into tight contact with the portion of wires 35 and 36 extending therethrough. Sleeve 33 may, if desired, be compressed into a hexagonal shape to form a splice having the appearance illustrated in Fig. 9. The splice thus formed, will be capable of resisting a very great pull and will provide excellent low resistance contact between wires 35 and 36 over a large area. It will be understood by those skilled in the art that if desired, the entire splice may be suitably coated or potted or otherwise protected, preferably by an insulating compound. The splice is quite short and has little bulk and is formed without soldering or any danger of burning the insulation 37 of the wires. Further, since the splice requires no twisting of the wires, the danger of breaking the wires by excessive twisting is entirely eliminated. This method of splicing is equally applicable to solid wires and stranded wires.

Fig. 10 shows another splicing ferrule 40, which includes a re-entrant groove 41 in a metallic sleeve 42. Here, the braided conductor 11 is crescent shaped when inserted in the metal ferrule and again is surrounded by a resilient silicone rubber sleeve or jacket 10. A splice is formed between a pair of wires 35 and 36 by passing the bare end of the wires through the ferrule from opposite ends thereof and then laying the ends 38 and 39 of the wires in groove 41. Sleeve 42 is then squeezed by a suitable tool such as a wrench or a pair of pliers to squeeze the braided conductor 11 against the portion of wires 35 and 36 lying therein, and also squeezing the edges 45 and 46 of channel or groove 41 together, or nearly so, so as to lock the wire ends 38 and 39 in the groove or channel of the ferrule. The ends 38 and 39 of the wires are thereby securely anchored in place and protected against snagging.

Figure 12:
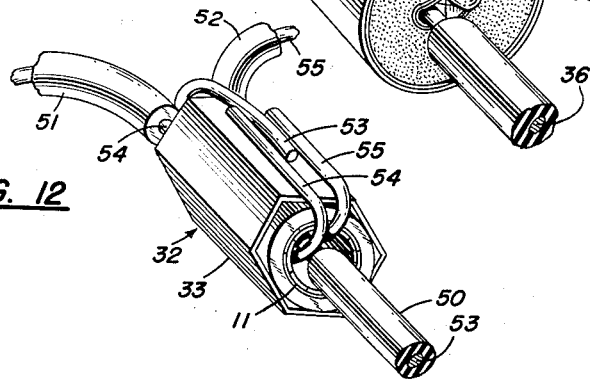
Fig. 12 is a perspective view showing a three conductor splice.

Fig. 12 illustrates a Y or bridge splice of three conductors. The splicing ferrule 32 may be of the same form as that illustrated in Figs. 7, 8 and 9. The ends of conductors 50–52 are bared. The end of conductor 50 is inserted through one end of the ferrule 32 and the ends of the other two conductors 51 and 52 are inserted through the braided conductor from the other end of the ferrule. The sleeve 33, which may be initially cylindrical, is then squeezed into a suitable polygonal shape such as a hexagon, in order to bring the braided tube 11 into tight contact with the three bare wires extending therethrough. The ends 53, 54, 55 of the wires are then bent back upon themselves along the sleeve 33 in the manner illustrated. The splice may, if desired thereafter, be dressed or coated or potted in any suitable manner. Other arrangements of conductors may be spliced in similar manner.

It will be evident that the tubular conductors 15 that I have described, have many electrical as well as mechanical advantages, some of which have already been referred to. In view of the fact that the braided conductor may be formed of tinsel or foil of extremely small thickness and that it has a relatively large area, it will have a very high heat dissipation ability and therefore will be capable of carrying increased currents. Since the braided conductor is very thin, it will exhibit little skin effect when carrying alternating current even of relatively high frequencies, and for this reason will develop relatively little eddy current and a reduced amount of heating.

Referring to Fig. 13, there is shown the manner in which connections may be made to the wire leads 61, 62 of an electron tube 60. Over each wire lead a piece of tubular insulation 63, commonly called spaghetti, is slipped. The ends of the tube leads may then be connected to conductors 65–68, etc. These connections may be made between two or more wires by using splicing ferrules 70 of the same type as shown in Figs. 7–9. When the conductors are of the type shown in Fig. 2, i.e., they include a braided tube, as shown at 71 on conductor 65, connections may be made by inserting the leads 61, 62 etc. between the inner core and the braided tube of the conductors. Interconnections such as 75 may be made by inserting the ends 76, 77 of the interconnecting wires into the braided tubes along with the tube leads. The connections can then be made tight by clamping ferrules 81, 82, 83 similar to ferrule 30 in Fig. 6, on the conductors.

Figs. 14–15 show the steps in making a terminal lug connection of the type shown in Fig. 6. Lug 90 is similar to lug 20 of Fig. 3 except that the terminal portion 22 is offset from the channel 21 as indicated at 91. After the end of wire 16 is bared, it is threaded through holes 27b and 27, V-shaped slot 27a of opening laid in channel 21 as shown. The channel 21 is then inserted in braided tube 11 and the tube and its coating 10 are pulled toward and over the lug to cover substantially the entire channel. The sleeve 30 is then applied and squeezed onto the end of the conductor as described in connection with Fig. 6.

Fig. 17 shows an electrical device 93 having terminals 94 and 95 which are similar to the channels of the lugs shown in Figs. 3, 14 and 15. These lugs may be connected to the conductors in the manner shown in Figs. 4–6 and 14–16 and described in connection therewith.

Lugs 94, 95 or 99 may also be connected very effectively and readily to a solid stranded or braided tubular conductor 102, as shown in Figs. 19 and 20. Here the wire 102 is given a U-shaped bend 103 by a suitable pair of pliers or other means. Conductor 102 is then placed in the channel of lug 99 with the bend 103 extending through slot 101. The width of bend 103 preferably is such that the sharp edges 104 of the slot bite into the bend or crimp and thus assist in forming an excellent connection. The sides 105 of lug 99 are then bent inwardly as shown in Fig. 20 to clasp wire 102 tightly. The wire is thus firmly clamped in the lug and securely anchored against pulling out of the lug and against rotating.

Fig. 21 shows an electrical device provided with a plurality of terminals 96, 96a, 96b. The terminals are provided with scalloped holes 108 having sharp points 109. The points 109 are dimensioned so that they will bite into a pin 100 of a lug 99 or pin 114 of a rivet 113 which may be forced into holes 108. The sharp points readily cut into the pins as they are pushed into the holes as shown in Fig. 23. This prevents the pin from turning within the lug, thereby insuring a good electrical connection therebetween.

Fig. 22 shows that not only the lugs 96, 96a, 96b, but lugs such as lug 20, Fig. 3, may be provided with scalloped openings. Here lug 20a has a scalloped hole 110 having inwardly projecting sharp points or edges 111 which cut into pin 114 and prevent the lug from turning, as indicated in Fig. 23. Lug 20a and conductor 112 connected thereto may be fastened to terminals 96, 96a, 96b by means of a rivet 113 having a pin 114. A plurality of such lugs 20a, and conductors 112, 112b may be fastened to lugs 96, 96a, 96b in various positions, as shown in Fig. 21. Fig. 22 shows that the inner wire 16 of the braided tubular conductor 112 may be wrapped round lug 20a at the very end or just beyond the end of conductor 112, the end of the conductor being provided with a clamping ferrule 30, as described with reference to Fig. 16. Alternatively, wire 16 may be simply cut off at the end of conductor 112.

The pin 114 of rivet 113 or pin 100 of lug 99 can be converted into a rivet with great ease to form a permanent tight fastening. This can be done merely by squeezing pins 100 or 114 with an ordinary pair of flat faced pliers. This may be explained as illustrated in Fig. 24. Here the pin of a lug or rivet is shown in Fig. 24A in its original condition. The pin may be soft copper of a thin gauge (e.g. 0.010″) and have an outer diameter of about 1/16 inch and a length of about 1/8 inch. When squeezed the inturned edge 100a is forced inward as indicated in Fig. 24B. After edge 100a has been turned inwardly considerably, as in Fig. 24B, it greatly resists further inward compression, and hence further pressure causes the pin to bow outwardly between the lugs 20a and the top of the pin. As the pin is squeezed still further the bowed portion thereof doubles up at 100c and the pin assumes the shape shown in Fig. 24C. Thus the pin becomes a strong tightly-clamping rivet merely by pressing with a pair of pliers. While this process has been performed many times, applicant does not desire to be limited by the above explanation thereof, but merely offers it for purposes of elucidation.

Fig. 25 shows an arrangement in which a plurality of conductors 116–120 are interconnected and maintained in their assigned relative positions. Conductors 116 and 120 are connected to lugs 121 and 122 which are similar to lug 99. Pin 123 is adapted to be inserted in the holes of lugs 124 and 125 and the sharp points 111 of these lugs will bite into pin 123. The assembled lugs may then be tightly squeezed, causing lug 121 to form a rivet fastening lugs 121, 124 and 125 together and maintaining them in their desired positions. Lugs 122 and 126 to 128 may then be similarly fastened together. An important advantage of this type of connection is that each wire and its lugs may be preassembled and then placed in position, so that interconnections in difficult to reach positions can be easily made by the simple operation of squeezing the lugs together by a pair of pliers. It will be evident that all lugs may be of the type of lugs 124–128 and fastened together by rivets 113.

The materials mentioned in the course of the description of the invention are not intended as limitations, but are proposed as illustrations to facilitate the practice of this invention. It should, therefore, be understood that the embodiments of the invention herein described, are intended merely to exemplify its principles and numerous modifications and alterations may be made without departure from the spirit and scope of the invention as set forth in the appended claims.

I claim:

1. An electrical connection comprising a conductor, a terminal having an opening therein, a lug connected to said conductor, a hollow pin fastened to said lug at one end and having an inturned edge at the other end, said pin extending through the opening and locked to said terminal, a plurality of sharp pointed projections bordering on said opening for embedded engagement with said pin as the pin is inserted into the opening for locking the terminal to the lug, the pin being formed of such a material and so dimensioned as to provide an annular outwardly extending multiple thickness flange at said other end thereof in engagement with the terminal as the pin is axially compressed to rivet the terminal to the lug, and means including a plurality of mutually spaced contact elements on the lug in engagement with said conductor for establishing an electrical connection therebetween.

2. An electrical connection according to claim 1 wherein the pin is integral with the lug.

3. An electrical connection according to claim 1 wherein the lug has an opening through which the pin extends, the pin having an enlarged pre-formed head at said one end and cooperating with the flange at the other end thereof for permanently securing and maintaining the lug in engagement with the terminal.

References Cited in the file of this patent

UNITED STATES PATENTS

| | | |
|---|---|---|
| 468,293 | Coleman | Feb. 2, 1892 |
| 1,697,954 | Gribbie | Jan. 8, 1929 |
| 1,844,011 | Hoover | Feb. 9, 1932 |
| 1,874,593 | Olson | Aug. 30, 1932 |
| 2,039,957 | Hall | May 5, 1936 |
| 2,267,630 | Weiland | Dec. 23, 1941 |
| 2,376,072 | Miller | May 15, 1945 |
| 2,424,528 | Wild | July 22, 1947 |
| 2,436,421 | Cork | Feb. 24, 1948 |
| 2,535,150 | Mead | Dec. 26, 1950 |
| 2,540,164 | Dean et al. | Feb. 6, 1951 |
| 2,681,440 | Swengel | June 15, 1954 |
| 2,708,741 | Orsini | May 17, 1955 |
| 2,718,627 | Swenson | Sept. 20, 1955 |
| 2,728,810 | Ziehr | Dec. 27, 1955 |
| 2,802,044 | Corne | Aug. 6, 1957 |
| 2,865,012 | Black | Dec. 16, 1958 |

FOREIGN PATENTS

| | | |
|---|---|---|
| 123,770 | Great Britain | May 25, 1920 |
| 467,011 | Great Britain | June 9, 1937 |
| 352,306 | Italy | Sept. 10, 1937 |